Feb. 20, 1951     P. G. PEIK     2,542,428

SOUND-DEADENING STRUCTURE

Filed Nov. 1, 1944

INVENTOR.
PAUL G. PEIK
BY Willard D. Eakin
Attorney

UNITED STATES PATENT OFFICE 2,542,428

SOUND-DEADENING STRUCTURE

Paul G. Peik, Akron, Ohio, assignor to Thomas L. Fawick, Akron, Ohio

Application November 1, 1944, Serial No. 561,473

1 Claim. (Cl. 72—17)

This invention relates to sound-deadening, sound-absorbing and sound insulating structures, and methods of providing the same.

Its chief objects are to provide a layer of material which can be of small thickness and yet be effective for damping the vibration of an underlying, contacting or adjacent sheet or wall of material; for absorbing the energy of sound waves and thus lessening transmission of sound through the material; and for lessening the reflection of sound.

Another object is to provide a fire-proof structure of this kind.

A further object is to provide a structure and a procedure adapted for convenient, economical and secure application of the sound-deadening structure to surfaces of various contours as well as to surfaces of plane or other simple form.

Another object is to provide a structure adapted for free flow of air along its surface, as in the case of ventilating tubes or tunnels in ships, without such numerous seams or crevices or projections as would set up eddy currents in the current of air and thus impede the current.

Figure 1:
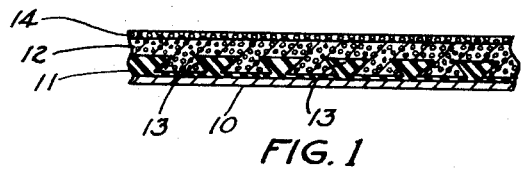
Fig. 1 is a sectional view of a metal sheet and a composite layer of materials thereon embodying my invention in its preferred form.

Referring to the drawings, and at first to Fig. 1, the structure there shown comprises a metal member 10, which can be, for example, the floor or wall of an automobile or of a ventilating tunnel in a ship, which, without the application of a sound deadening structure, would be subject to being set into sound emitting vibration by the pulsations of a motor, or by gunfire or the like in the case of a vessel of war.

Secured by a suitable adhesive to one of the extensive faces of the member 10, which can be the inner surface in the case of an automobile floor or body, or can be either the inner or outer surface in some installations, is a layer of vulcanized soft-rubber or the like 11, preferably of low grade, inexpensive, highly pigmented rubber having high hysteresis loss in being deformed.

This layer of rubber or the like is formed, on its face farthest from the member 10, with undercut anchorage recesses for receiving portions of and thus anchoring a layer 12 of a setting composition such as fine-aggregate concrete, the anchorage recesses in this embodiment being defined by a series of parallel, dove-tail ribs 13, 13 formed as an integral part of the layer 11 of rubber or the like.

The layer 12 of setting material preferably is of Haydite concrete, the small aggregate particles being of a material known as Haydite, formed of a mixture of clay and shale burned almost to fusion and later ground and sifted.

A characteristic of these particles is understood to be that in the burning process the destruction of organic matter leaves small, closed cells in the material, but with the cells broken open at the surface of each particle in the grinding operation, so that the Portland cement acquires firm anchorage to them.

Advantages of the Haydite concrete are that it is very light, yet strong, adapted to withstand vibration without deterioration, and has apparently high sound-deadening effect, especially when combined with the rubber-like layer.

The concrete layer can be formed on the rubber layer by molding it against the rubber before the rubber is applied to the member 10. For economy, the rubber layer preferably is formed by extrusion and vulcanized in open heat and the concrete preferably is troweled onto it after the rubber layer has been secured to the member 10.

For the concrete layer of this embodiment of Fig. 1, the mix preferably consists of about one part by measure of the Haydite particles to one part of mortar cement.

After the concrete layer has been applied but before it has set an "acoustic" layer 14, of glass-fiber or other felt or the like, can be stuck to it to provide against echoing or reflecting of sound from that side of the structure.

In tests the structure shows strikingly high sound-deadening effects, which may be due in part to the fact that the three layers 10, 11 and 12 individually have widely different natural rates of vibration.

Figure 2:
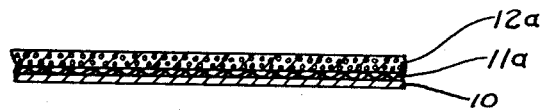
Fig. 2 is a similar view of a modification.

In the modification shown in Fig. 2 a layer 11a of fabric is adhered to the member 10 and the layer 12a of setting material is of plaster of Paris or other material adapted to adhere to the face of the fabric in the process of setting.

Figure 3:
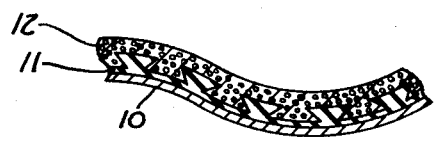
Fig. 3 is a sectional view of structure corresponding to that of Fig. 1 except that an acoustic surface layer is omitted and the composite sound-deadening layer is applied to concave and convex portions of the surface of a backing.

The structure shown in Fig. 3 corresponds to that shown in Fig. 1 except that the "acoustic" layer 14 of Fig. 1 is omitted and the figure shows the adaptability of the structure for a wall or floor member of convex or concave contour.

Figure 4:
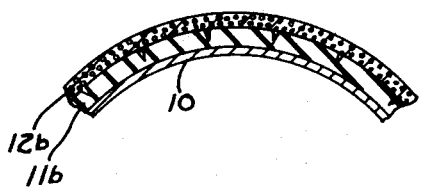
Fig. 4 is a sectional view in which the sound-deadening structure is adapted for application to a convex surface with rib elements bent to conform to the convexity of the surface.
Figure 5:
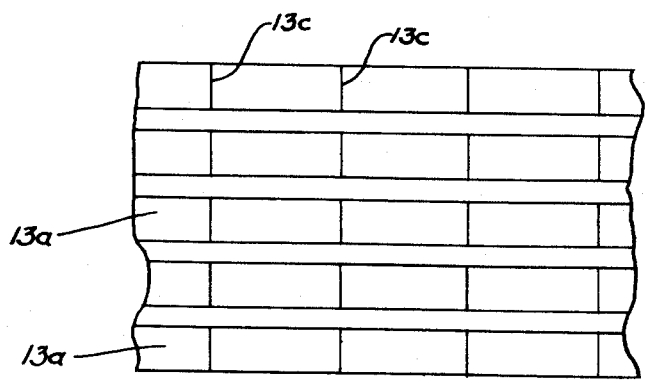
Fig. 5 is a face view of a foundation layer such as is employed in the structure of Figure 4.

In some installations the rubber layer, 11b (Figs. 4 and 5), may be required to be applied with its ribs curved in the direction of their own lengths, and to make them more bendable the ribs can be cross-cut at intervals, as at 13c, 13c, Figs. 4 and 5, down to, but not through, the web that connects them.

Figure 6:
Fig. 6 is a sectional view of a modification having provision different from that of Figure 1 for lessening reflection of sound.

The structure shown in Fig. 6 corresponds to that shown in Fig. 1 except that instead of the acoustic layer 14 of the glass-fiber felt or the like a non-sound-reflecting surface is provided by preforming, as by molding, and then setting in the surface of the 1 to 1 Haydite concrete 12, a multiplicity of tiles 15, 15 formed of about 10 to 1 Haydite concrete, the small amount of Portland cement requiring the preforming of the tiles as by molding and providing a porosity having the effect of reducing sound-reflection. At the same time the tiles also have the function of adding their effect to that of the underlying layer for damping vibration of the structural member 10.

Further modifications are possible within the scope of the appended claim, which is not wholly limited to a layer of setting material having great rigidity or stiffness against bending.

In the appended claim the word "wall" is intended to be inclusive of ceilings.

I claim:

A sound-deadening, habitation-defining, housing structure comprising a sheet of material having substantially the resilient deformability of vulcanized soft-rubber and formed with projections on one of its extensive faces and a set layer of an initially flowable setting material formed against said sheet and having the projections embedded therein and supportingly interlocked therewith, and means supporting the said structure as a wall element of a building, the defined sheet of material being supported by the defined supporting means and the defined set layer being supported by the defined sheet of material.

PAUL G. PEIK.

REFERENCES CITED

The following references are of record in the file of this patent:

UNITED STATES PATENTS

| Number | Name | Date |
|---|---|---|
| 906,025 | Howe | Dec. 8, 1908 |
| 1,115,266 | Wiltse | Oct. 27, 1914 |
| 1,255,878 | Hayde | Feb. 12, 1918 |
| 1,383,344 | Shaw | July 5, 1921 |
| 1,494,926 | Makowski | May 20, 1924 |
| 1,707,255 | Darrow | Apr. 2, 1929 |
| 1,728,991 | Draullette | Sept. 24, 1929 |
| 1,870,101 | Davey | Aug. 2, 1932 |
| 1,906,637 | Schulke | May 2, 1933 |
| 1,950,420 | Stitt | Mar. 13, 1934 |
| 1,955,443 | Spafford | Apr. 17, 1934 |
| 2,114,386 | Killion | Apr. 19, 1938 |
| 2,139,851 | Roberts | Dec. 13, 1938 |
| 2,168,949 | Bentz et al. | Aug. 8, 1939 |
| 2,323,936 | Roberts | July 13, 1943 |

FOREIGN PATENTS

| Number | Country | Date |
|---|---|---|
| 456,189 | France | Aug. 19, 1913 |
| 68,612 | Switzerland | Apr. 22, 1914 |
| 300,138 | Great Britain | Oct. 3, 1929 |
| 171,632 | Switzerland | Nov. 16, 1934 |